Figure 3:
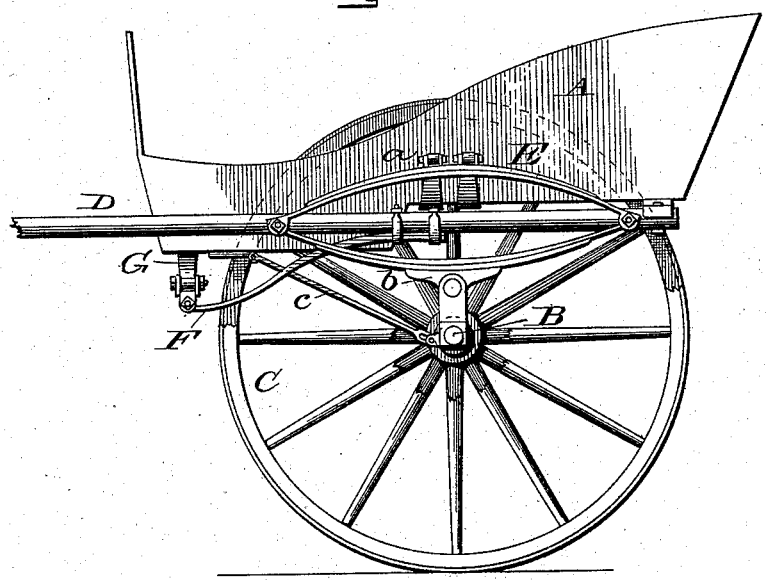

(No Model.) 2 Sheets—Sheet 1.
F. COLEMAN.
TWO WHEELED VEHICLE.
No. 292,896. Patented Feb. 5, 1884.
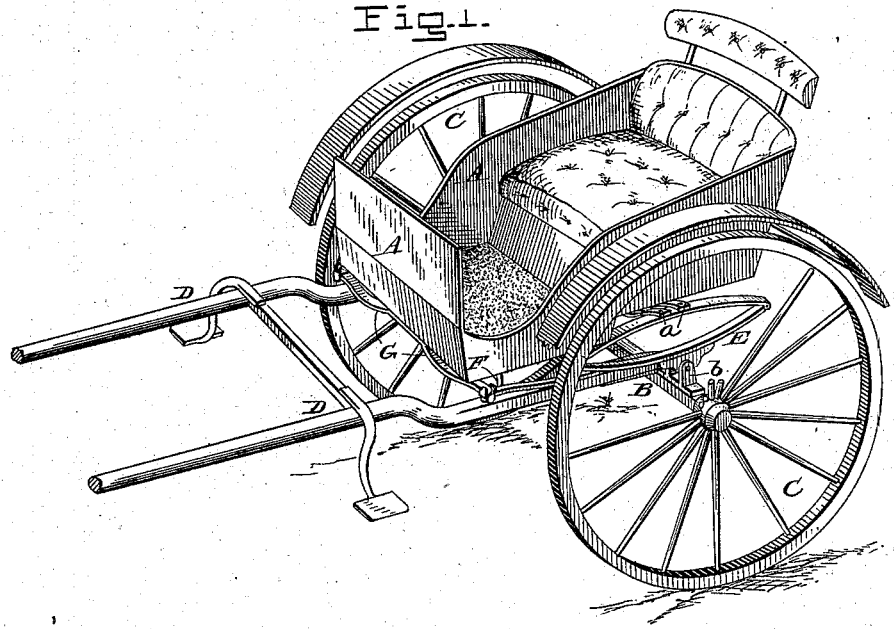
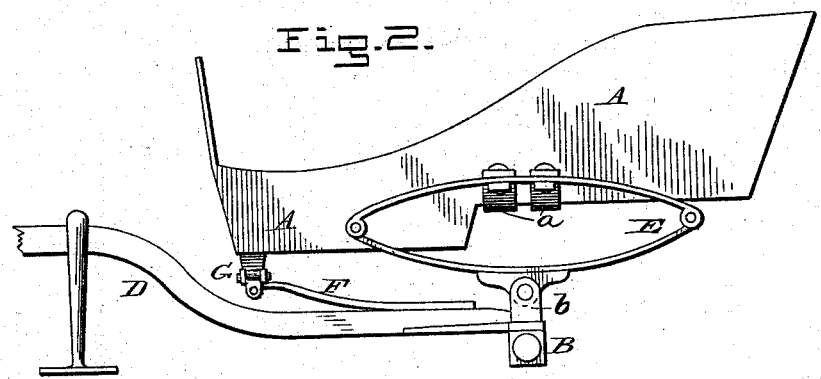
WITNESSES
Jas. F. DuHamel.
Walter S. Dodge
INVENTOR
Fredrick Coleman
by Dodge & Son
Attys (No Model.) 2 Sheets—Sheet 2.

F. COLEMAN.
TWO WHEELED VEHICLE.

No. 292,896. Patented Feb. 5, 1884.

WITNESSES
Jas. F. Du Hamel
Walter S. Dodge

INVENTOR:
Fredrick Coleman,
by Dodge & Son,
Attys.

UNITED STATES PATENT OFFICE.

FREDRICK COLEMAN, OF ILION, NEW YORK.

TWO-WHEELED VEHICLE.

SPECIFICATION forming part of Letters Patent No. 292,896, dated February 5, 1884.

Application filed September 14, 1883. (No model.)

*To all whom it may concern:*

Be it known that I, FREDRICK COLEMAN, of Ilion, in the county of Herkimer and State of New York, have invented certain Improvements in Two-Wheeled Vehicles, of which the following is a specification.

My invention relates to that class of two-wheeled vehicles commonly designated "road-carts" or "village-carts;" and the improvements consist in a novel arrangement of the springs, whereby the unpleasant "horse-motion" is prevented, the primary feature of the invention consisting in attaching the side springs to the axle by hinge-joints.

In the accompanying drawings, Figure 1 represents a perspective view of a vehicle embodying my improvements; Fig. 2, a side elevation of the same, with the wheels removed; and Fig. 3, a side view with one of the wheels partly broken away, showing a slight modification.

Vehicles of the class referred to have had their springs arranged in a variety of ways, with a view to lessening or overcoming the vertical rocking motion due to the movements of the horse; but the construction below set forth is believed to accomplish the desired end more perfectly and cheaply than former plans.

A represents the body or box, which may be of any usual or desired pattern; B, the axle; C, the wheels; D, the shafts; and E the main side springs supporting the box upon the axle. The box or body rests upon and is bolted or otherwise firmly secured to cross-straps a, preferably of metal, resting at their ends upon and bolted or riveted to the upper sides of the elliptic side springs, E, which are in turn mounted upon the axle B, and connected therewith by hinge joints or connections b, which permit a movement of the body and the axle, each independent of the other. The shafts D extend back and are rigidly attached to the axle B, and each shaft bears a spring, F, which extends forward and connects with one end of a bow-shaped cross-spring, G, the middle portion of which may be secured to the under side of the box or body, as shown, or which may be carried by jack-irons extending forward in advance of the box, as is common in many vehicles.

Under the foregoing construction the weight of the load comes upon the main side springs, directly over the axle, and the springs E being practically balanced upon the axle, or upon the hinge-joints b, are prevented by the springs F G from being rocked or tipped out of position. At the same time the springs F G, being comparatively light, and the rigid end of springs F being made fast to the shafts, close to the joints b, it follows that, although a considerable motion is given to the forward ends of the shafts, the motion is very slight at the points where the springs F are applied, and consequently said springs receive very little motion. The slight motion that is imparted to said springs F is taken up almost entirely by their elasticity and that of the spring G; hence little, if any, of the motion of the horse is transmitted to the box or body. The hinge-joint might be at the upper side of the spring instead of the lower, but would not give as good results as under the arrangement shown and described.

Instead of bending the shafts and connecting them directly to the axle, they may be made straight, carried along each side of and secured to the box or body A, as in Fig. 3, the joint or hinge b being in such case omitted, or braces or stay-rods c being provided to prevent the axle from swinging backward, if the joint be used.

The springs F may be applied to the body and spring G to a cross-bar on the shafts.

I am aware that it is not broadly new to provide a two-wheeled vehicle with side springs connected with the axle or with the body by pivots, and hence I do not claim such construction, broadly.

Having thus described my invention, what I claim is—

1. The herein-described vehicle, consisting of body A, axle B, wheels C, shafts D, connected to the axle, side springs, E, supporting the body and connected with the axle by hinge-joints, springs F, secured to the shafts, and cross-spring G, attached to the body, and having its ends connected with the springs F, all substantially as shown and described.

2. In combination with the body and shafts of a vehicle, intermediate connecting-springs, F G, applied substantially as shown and described.

3. In a two-wheeled vehicle, the combination of two supporting-wheels, an axle therefor, a body above and supported by said axle, shafts for drawing the vehicle, a cross-spring secured to the fore part of the body, and springs running lengthwise of the shafts and having their forward ends connected with the ends of the cross-spring and their rear ends attached to the shafts, substantially as shown and described.

FREDRICK COLEMAN.

Witnesses:
G. O. RASBACH,
FRED. H. BENNETT.